Dec. 19, 1950 H. C. WENDT 2,535,003
GYROSCOPIC INSTRUMENT
Filed Sept. 13, 1946
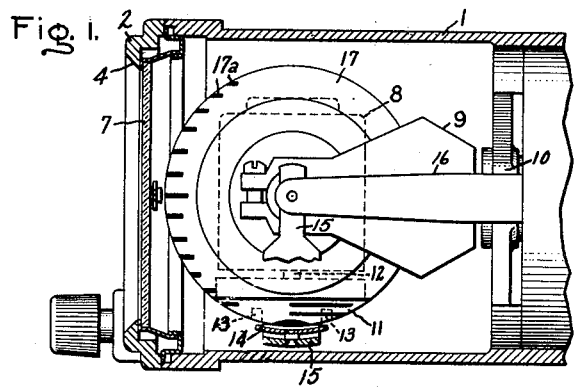
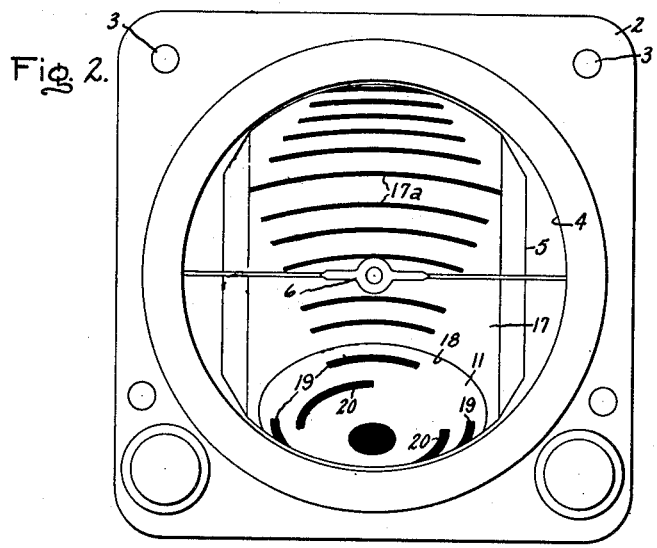
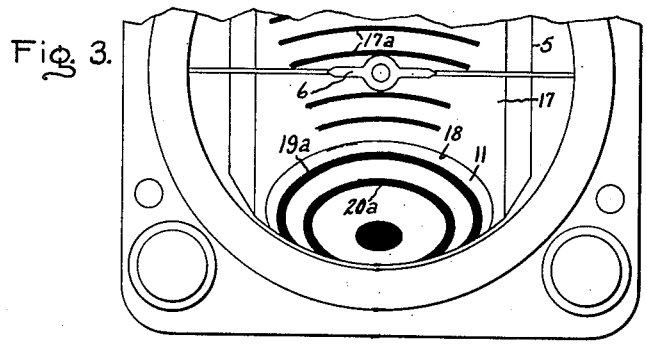
Inventor:
Harry C. Wendt,
by Claude A. Mott
His Attorney.

Patented Dec. 19, 1950

2,535,003

UNITED STATES PATENT OFFICE 2,535,003

GYROSCOPIC INSTRUMENT

Harry C. Wendt, Lynnfield, Mass., assignor to General Electric Company, a corporation of New York Application September 13, 1946, Serial No. 696,907

1 Claim. (Cl. 33—204)

The present invention relates to gyroscopic instruments and more particularly to gyroscopic instruments of the type used to indicate the attitude of an aircraft in flight.

Gyroscopic instruments are now widely used on aircraft for indicating the attitude of the aircraft in space during blind flying conditions when the horizon is partially or totally obscured. During such times great reliance is placed on these instruments and it is therefore important that the pilot be informed in case the gyroscope ceases to rotate as might be caused by power or drive-motor failure. Behavior of the instrument is not a sufficiently reliable indication of this condition because the influence of gravity may cause the instrument to appear to be operating properly while actually it is giving a spurious indication. Such a condition is particularly dangerous during take-off as the erroneous indication may cause the pilot to fly the aircraft into the ground or into a stalling attitude which usually results in a fatal spin.

An object of the present invention is to provide a gyroscopic instrument having an improved arrangement for indicating rotation of the gyroscope.

A further object is to provide a gyroscope rotation indicator which is simple, reliable and which can be incorporated in gyroscope attitude indicating instruments at a low cost.

A still further object of my invention is to provide an attitude indicating instrument for aircraft of the gyroscopically stabilized ball or sphere type in which the rotating part of the erection system is arranged to form a continuation of the indicating indicia of the attitude indicating ball or sphere to permit a reduction in the size and weight of the erection system.

Further objects and advantages of the invention will become apparent and the invention will be better understood from the following description referring to the accompanying drawing and the features of novelty which characterize the invention will be pointed out with particularity in the claim annexed to and forming a part of this specification.

In the drawing:

Fig. 1 is a side elevation view, partly in section, of a gyroscopically actuated attitude indicating instrument illustrating a preferred embodiment of the invention.

Fig. 2 is a front elevation view of the instrument shown in Fig. 1, illustrating the indication obtained when the gyroscope is not rotating.

Fig. 3 is the same as Fig. 2 except that it shows the indication obtained when the gyroscope is rotating.

Referring to the drawing I have shown my invention as embodied in a gyroscopically actuated attitude indicating instrument for aircraft of the so-called stabilized sphere or ball type. The instrument is shown as comprising a cylindrical casing 1 which is adapted to be inserted into an opening in the dash panel of an aircraft. Attached to the open front of the casing is a face plate 2 having openings 3 adapted to receive mounting bolts used to fasten the instrument to the dash panel. The face plate 2 has a circular opening 4 through which the relative positions of a circular attitude indicator 5 and a miniature airplane 6 are observed whereby the pitch and bank attitudes of the aircraft are determined. A cover glass 7 is provided for sealing the observation opening.

For purpose of stabilizing the attitude indicator 5 there is provided a conventional gyroscope (not shown) which is mounted for rotation about an approximately vertical axis in a rotor bearing frame 8. The gyroscope may be driven by a suitable pneumatic or electric motor (not shown). In order to provide a universal mounting for the gyroscope there is provided a yoke-shaped gimbal member 9 carrying at its forward end trunnions (not shown) for permitting rotation of the bearing frame 8 about a transverse axis perpendicular to the spin axis of the gyroscope. The gimbal 9 is supported by bearings, one of which is indicated at 10, so that it is free to rotate 360 degrees about a longitudinal axis which is perpendicular to the axis of the trunnions supporting the bearing frame 8.

For the purpose of maintaining the spin axis of the gyroscope in the approximately vertical position there is provided an eddy-current erection system which is preferably, although not necessarily, of the type disclosed in my co-pending application S. N. 636,672, filed December 22, 1945, which became Patent No. 2,486,897, issued Nov. 1, 1949, which is assigned to the same assignee as this present invention. The erection system is shown as comprising a rotating member 11 mounted on a shaft extension 12 of the gyroscope rotor so that the member 11 is supported by and rotated with the rotor. The member 11 has embedded therein a plurality of permanent magnets 12 arranged in a circle concentric with the spin axis of the gyroscope, the magnets providing a magnetic field which rotates with the gyroscope rotor. The rotating magnetic field induces eddy currents in a current conducting cup 14 in such a way that the resulting drag torque causes the gyroscope continuously to precess so that the spin axis remains in alignment with the center of the cup 14. The erecting cup 14 is pendulously supported on a bail 15, the bail being pivotally carried at the forward end of a second yoke-shaped gimbal member 16, the rear end of which is mounted on bearings (not shown) so as to rotate about an axis coincident with the longitudinal axis of the gimbal member 9. This mounting arrangement permits universal movement of the erecting cup 14 which is positioned by the force of gravity.

The miniature airplane 6 is carried by the frame 1 so that it rotates about a longitudinal axis during roll movement of the aircraft and rotates about a transverse axis during pitch movement of the aircraft. Since the attitude indicator 5 is stabilized in space by the gyroscope it will be clear that the orientation of the miniature airplane 6 relative to the stabilized attitude indicator 5 permits the pilot to determine the pitch and bank attitudes of the aircraft in flight.

The circular attitude indicator 5, which is mounted on and carried by the gyroscope rotor bearing frame 8 in any suitable manner, not shown, has a central section 17, the contour of which is preferably spherical. The spherical center section 17 carries suitable indicia 17a preferably in the form of graduated horizontal lines which, when compared with the position of the miniature airplane 6, provide a measure of the pitch and bank attitudes of the aircraft.

In attitude indicating instruments of this general type as heretofore used, the central spherical section 17 of the attitude indicator 5 is formed as a continuous surface on the underside of the rotor bearing frame which surface separates the rotary and stationary parts of the gyroscope erection system. This arrangement requires magnetic field producing means of considerable size and weight due to the intervening material which necessitates a relatively large air gap. According to one aspect of the present invention, this difficulty is obviated by an arrangement in which the rotary member 11 forms a continuation of the spherical surface of the center section of the attitude indicator 5. To accomplish this the lower surface of the section 17 is provided with a circular opening 18 which receives the rotary member 11 in flush relation, the lower surface of the member 11 and the outer surface of the center section 17 having the same radius of curvature. This construction, which eliminates intervening material between the erecting system parts 11 and 14, permits the use of a small air gap between these parts so that the required erecting torque is obtained with a weaker magnetic field than has been possible heretofore. As a result considerable economy in the size and weight of the erection system is obtained.

The attitude indicator described above is designed to give universal operation, i. e., it measures the pitch and bank attitudes of the aircraft for all attitudes into which the aircraft can be flown, including vertical climbs and dives, and inverted flight. There is, therefore a need for continuing the indicia 17a to the bottom of the attitude indicator 5 including the area swept by the rotary member 11 in order to permit a measurement of climbs up to 90 degrees. In order to accomplish this and also to provide a simple but reliable gyroscope rotation indicator, the lower surface of the rotary member 11 is provided with a series of discontinuous markings such as those illustrated at 19 and 20 in Fig. 2. When the gyroscope rotor and the rotary member 11 are stationary, the markings 19 and 20 have a broken or discontinuous appearance as in Fig. 2. However, these markings are arranged so that when the gyroscope rotor and rotary member 11 are rotating the marks appear, due to the persistence of vision, as concentric circles 19a and 20a as shown in Fig. 3. Thus it will be clear that by simply observing the appearance of the markings on the rotary member 11 the pilot or other observer can tell at a glance whether or not the gyroscope is operating. Furthermore, by properly locating the markings 19 and 20, the circle 19a and 20a can be made to appear as continuations of the indicia 17a on the spherical center section 17 of the attitude indicator. Thus in the illustrated arrangement a registration of the miniature airplane 6 with the circular line 19a may, for example, indicate a 70 degree climb while registration of the miniature airplane with the circular line 20a may indicate an 80 degree climb. By arranging discontinuous markings such as 19 and 20 at different radial distances from the axis of rotation of the member 11 reference lines or indicia can be obtained to indicate any desired angle of climb that would bring the area of the rotary member 11 opposite the miniature airplane 6. Other forms of discontinuous markings can of course be used without departing from my invention which utilizes the principle that discontinuous markings present a different appearance to the eye when moving than when stationary due to the phenomenon known as the persistence of vision. If desired, the markings 19 and 20 may be painted on the rotary member 11 with luminous paint so as to permit observation of the indication at night.

When the aircraft is in normal level flight position the rotary member 11 is at the bottom of the casing 1 as shown in Fig. 1. The instrument may be designed so that in this position the pilot or observer can see at least a part of the rotary member 11 through the cover glass 7 to determine, by the appearance of the marks 19 and 20, whether or not the gyroscope is rotating. However, if the pilot desires to get a less obstructed view of the rotary member 11, he may place the aircraft in a climbing attitude which causes an apparent upward movement of the member 11 into the bottom portion of the field of view through the opening 4. This condition is illustrated in Figs. 2 and 3 of the drawing.

As pointed out above there is a definite advantage in incorporating the gyroscope operation indicator as a part of the erection system. However, if desired, the indicator may be made entirely separate from the erection system. For example, the gyro shaft may be extended on the top side of the bearing frame 8 and a rotary member having a shape and marking similar to the member 11 may be located in an aperture situated on the top side of the center section 17 of the attitude indicator.

An additional advantage of my improved gyroscope operation indicator is that it may be used as a simple check to see whether or not the rotation of the gyroscope is in the proper direction. To accomplish this it is only necessary to energize the gyroscope drive motor after it has been stopped and then observe the direction of rotation of the marks 19 and 20 as they begin to rotate. In this manner servicing of the instrument is greatly simplified.

In cases where synchronous electric motors, such as hysteresis motors, are used to drive the gyroscope rotor, the arrival of the motor synchronous speed can be easily determined by illuminating the marked rotary member 11 with an intermittent light such as obtained from a neon tube (not shown) energized from the same power supply as the drive motor. This permits a stroboscopic determination of rotor speed, and by suitably selecting the spacing of marks 19 and 20 the flashing pattern may be made to appear stationary at synchronous speed.

It will be clear from the foregoing that I have provided a simple yet reliable indicator by means of which the observer of an aircraft attitude indicating instrument may quickly and easily check to see if the gyroscope is operating. Furthermore, it will be apparent that by providing a construction in which the rotary member of the gyroscope magnetic erection system forms a part of the attitude indicating sphere or ball, a smaller air gap between the magnet and eddy current members of the erection system can be obtained, permitting the use of smaller and lighter magnetic field producing means.

Modifications of the particular arrangements which I have disclosed embodying my invention will occur to those skilled in the art, so that I do not desire my invention to be limited to the particular arrangements set forth and I intend in the appended claim to cover all modifications which do not depart from the spirit and scope of my invention.

What I claim as new and desire to secure by Letters Patent of the United States is:

In a gyroscope attitude indicating instrument, a universally mounted gyroscope comprising a gyroscope rotor mounted to rotate in a rotor bearing frame, an attitude indicator mounted on and encircling at least a part of said bearing frame, a portion of the surface of said indicator being approximately spherical and having attitude indicating indicia marked on the exterior thereof, said attitude indicator having an opening therein in a part of the spherical surface thereof in alignment with the spin axis of the gyroscope, and an erection system for said gyroscope comprising a rotating element driven by said gyroscope rotor and a cooperating pendulous member separated only by a small air gap, said rotating element comprising a spherical segment arranged so that its outer surface constitutes a continuation of the spherical contour of said attitude indicator across said opening and so that no portion of said indicator can interrupt said small air gap between said pendulous member and the exterior of said rotating element, and said rotating element having markings thereon arranged to appear as a continuous circular line when rotating, said circular line forming a continuation of the indicating indicia of said attitude indicator.

HARRY C. WENDT.

REFERENCES CITED

The following references are of record in the file of this patent:

UNITED STATES PATENTS

| Number | Name | Date |
|---|---|---|
| Re. 20,701 | Gillmor | Apr. 19, 1938 |
| D. 139,881 | Haskins et al. | Jan. 2, 1945 |
| 1,989,826 | Schenk | Feb. 5, 1935 |
| 2,167,422 | Langgasser | July 25, 1939 |
| 2,418,651 | Musshardt | Apr. 8, 1947 |

FOREIGN PATENTS

| Number | Country | Date |
|---|---|---|
| 140,482 | Great Britain | Apr. 1, 1920 |